United States Patent [19]

Gysin et al.

[11] Patent Number: 5,711,412
[45] Date of Patent: Jan. 27, 1998

[54] DEVICE FOR SERIAL TRANSPORT OF SHEET METAL BLANKS TOWARDS A PROCESSING STATION

[75] Inventors: Hanspeter Gysin, Zurich; Hanspeter Oehrli, Friedlisberg; Armin Ineichen, Wohlen, all of Switzerland

[73] Assignee: Elpatronic AG, Zug, Switzerland

[21] Appl. No.: 549,797

[22] PCT Filed: Feb. 16, 1995

[86] PCT No.: PCT/CH95/00035

§ 371 Date: Nov. 6, 1995

§ 102(e) Date: Nov. 6, 1995

[87] PCT Pub. No.: WO95/24284

PCT Pub. Date: Sep. 14, 1995

[30] Foreign Application Priority Data

Mar. 7, 1994 [CH] Switzerland ............... 660/94

[51] Int. Cl.⁶ .................................................. B65G 19/26
[52] U.S. Cl. ................................. 198/732; 198/817
[58] Field of Search ................................. 198/728, 731, 198/732, 802, 817

[56] References Cited

U.S. PATENT DOCUMENTS

| | | | |
|---|---|---|---|
| 2,236,747 | 4/1941 | Cameron. | |
| 4,682,684 | 7/1987 | Lothman | 198/732 X |
| 4,697,693 | 10/1987 | Rajala et al. | 198/699 |
| 4,890,724 | 1/1990 | Loewenthal | 198/732 |
| 4,997,081 | 3/1991 | Sutin | 198/728 |
| 5,452,789 | 9/1995 | Wolpers et al. | 198/728 |
| 5,501,318 | 3/1996 | Disrud | 198/732 |

FOREIGN PATENT DOCUMENTS

| | | | |
|---|---|---|---|
| 3634712 | 5/1987 | Germany. | |
| 57-156915 | 9/1982 | Japan. | |
| 1245517 | 7/1986 | U.S.S.R. | 198/732 |

OTHER PUBLICATIONS

Patent Abstracts of Japan, vol. 6, No. 263, 22 Dec. 1982.

*Primary Examiner*—James R. Bidwell
*Attorney, Agent, or Firm*—McCormick, Paulding & Huber

[57] ABSTRACT

The device according to the invention for ejecting sheet metal blanks from a processing station or for any transport of such sheet metal blanks has ejector dogs mounted on a transport conveyor, which bump the trailing edge (trailing in the ejection direction (A)) to eject the blanks. These ejector dogs are arranged so that upon impact on the blank edge they are shifted and/or tilted in a damped manner, and with absorption of energy, with respect to the transport conveyor, in the opposite direction to the ejection direction, thus reducing the forces acting on the edge of the blank. As transport conveyor, the preferred embodiment has a toothed belt which is elastically deformed and deflected from its path upon impact of the dog on the blank edge, so that the belt itself acts as damper and as return spring for the dog.

7 Claims, 3 Drawing Sheets

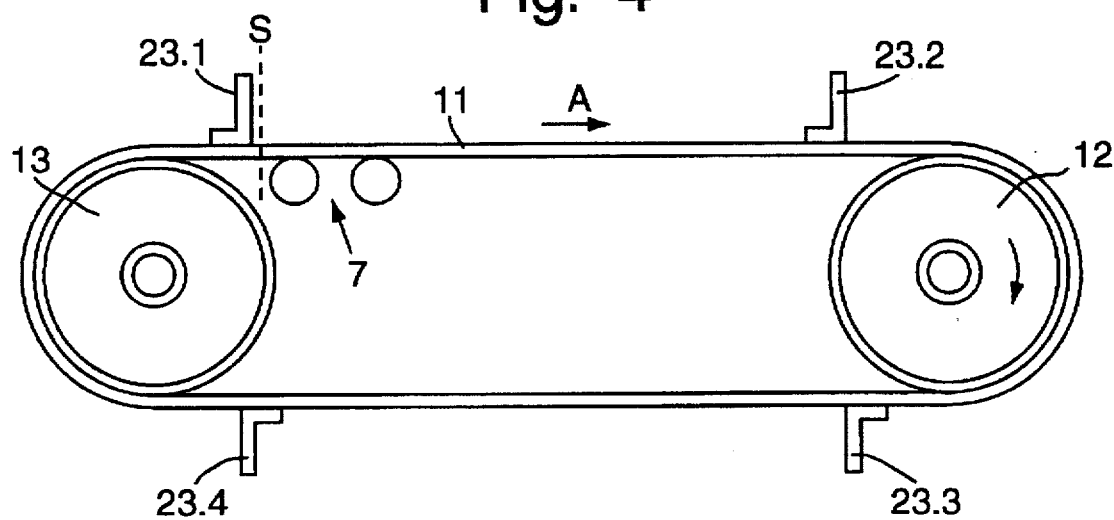
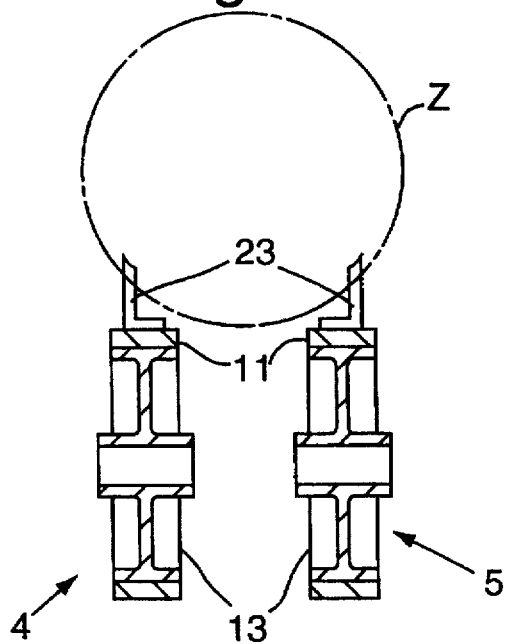
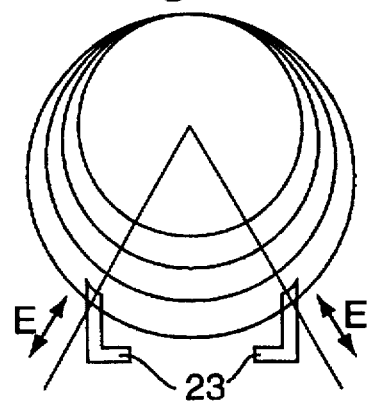

DEVICE FOR SERIAL TRANSPORT OF SHEET METAL BLANKS TOWARDS A PROCESSING STATION

BACKGROUND OF THE INVENTION

The invention relates to a device according to the independent claim for serial transport of sheet metal blanks towards a subsequent processing station, wherein the acceleration force necessary for the transport is applied to the edge of the sheet metal blank which is the trailing edge in the transport direction. In particular the invention relates to a device for ejecting rounded sheet metal blanks from a rounding station or for onward transport of the rounded blanks towards a welding station in which they are welded to form cylindrical can bodies. However, the device may for example also be used in the manufacture of compound panels formed by welding flat sheet metal blanks together.

According to the state of the art, flat sheet metal blanks are welded together to produce compound panels, for example in accordance with European Patent No. 0279866. Also, for the manufacture of can bodies, flat sheet metal blanks are rounded between a cylinder and a hollow cylinder in a rounding station to which they are fed essentially tangentially to the rounding required, and are then ejected from the rounding station in the axial direction. Still moving in the same direction, they are then transported towards a welding station, in which their edges which have been made to overlap by the rounding operation and by a suitable edge guide are welded together.

Usually, flat panels or cylindrical bodies for welding are transported by means of pusher dogs; can bodies for example are ejected from the rounding station by directing the dogs on to the rounded edge of the sheet metal blanks which is the trailing edge in the ejection direction. A number of such dogs are for example attached to an endless chain which is guided and driven by sprockets so that as soon as a sheet metal blank has been rounded, an ejector dog is directed on to the rounded edge of the blank which is the trailing edge in the ejection direction, thus ejecting the rounded blank in the axial direction with an accelerated motion. The chain drive is controlled so as to accelerate each dog from an impact velocity to a maximum velocity for the ejection. The time required for the ejection is governed by (among other factors) the difference between the impact velocity and the maximum velocity, and by the acceleration which can be obtained.

With modern welding techniques, and with standard heights of can body (i.e. lengths of welded seam), production rates of up to 1000 can bodies per minute are possible, implying cycle times of down to 60 msec. In order to be able to achieve such high production rates in practice, it must also be possible to perform the rounding (assuming standard can body diameters) together with the ejection from the rounding station within the same very short cycle time. However, in order to be able to shorten the cycle time, it is necessary either to increase the rounding rate or to enable ejection to be performed within a shorter time.

It is therefore the object of the invention to provide a device for ejecting sheet metal blanks from a processing station, which device allows shorter ejection times than corresponding devices according to the state of the art (usually pusher dogs on conveyor chains driven by gears) so as to allow sufficient time for problem-free rounding even at the highest production rates and for can bodies with relatively large diameters. Besides meeting the stated object, the device according to the invention is capable of surviving jams or tailbacks of blanks without sustaining damage, and to guarantee extremely long and problem-free service life (e.g. $10^8$ can bodies). Furthermore, the device needs to be easily adaptable to different body sizes (body diameters). Moreover the device according to the invention can be used in the general transport system for flat panels or cylindrical bodies. For the transport of cylindrical bodies in particular, there exist other transport paths besides the ejection from the rounding apparatus, over which the can bodies have to be accelerated, and on which the device according to the invention can be used to advantage.

SUMMARY OF THE INVENTION

The present invention resides in a device for serially transporting sheet metal, blanks towards a subsequent processing station by means of a transporting means. The transporting means is driven with a synchronized velocity profile, and has at least one transport element arranged on the transport means so as to be capable of a damped shifting and/or rocking action with energy absorption in a direction opposite to the transport direction. The device has particular utility in an arrangement for manufacturing can bodies in which rounded sheet metal blanks are ejected from a rounding station toward a welding station.

According to the invention, the object is achieved by modifying the characteristic curve of the impact of an ejector element on the edge of the can body while the latter is still stationary or, generally, on an edge which is moving at a slower speed ahead of the ejector element. Instead of an abrupt impact or abrupt acceleration by an ejector element which is rigidly fixed to a transport means, a gentle impact occurs, in other words a reduced acceleration of the can body over a predetermined time span. This time span starts at the moment of contact of the ejector element with the can body, and ends as soon as the ejector element has reached an end position following displacement with respect to the transport means. The displacement occurs in a damped manner, and is caused by the inertia of the can body.

This makes it possible to increase the relative velocity between the ejector element and the edge of the blank to be ejected prior to impact to a level at which damage to the can body or flat panel would result if the ejector element were rigidly fixed to the transport means. The higher initial acceleration of the can body enables it to leave the rounding apparatus more rapidly. Furthermore, there is a reduction in the residual acceleration which is still required to achieve maximum velocity according to the state of the art, thus reducing the workload of the transport drive mechanism.

Alternatively, a higher maximum velocity can be attained.

BRIEF DESCRIPTION OF THE DRAWINGS

The invention will now be described in detail with reference to the drawings which follow, in which:

FIG. 4 shows by way of example an embodiment of the ejector device according to the invention, in a view at right angles to the ejection direction;

FIG. 5 shows the embodiment shown in FIG. 4, viewed in the ejection direction;

FIG. 6 shows an ejector dog for the device shown in FIGS. 4 and 5;

DESCRIPTION OF THE PREFERRED EMBODIMENTS

Figure 1:
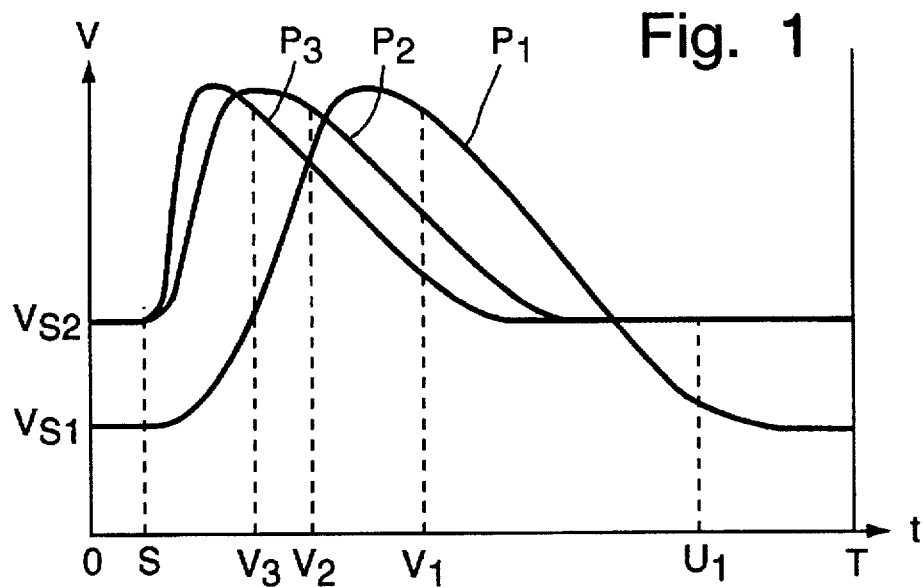
FIG. 1 shows examples of motion curves for an ejector element during a cycle time T.

FIG. 1 shows examples of motion curves ($P_1$, $P_2$, $P_3$) for ejector elements (or more generally for transport elements) during a specified cycle time T. In this diagram, the velocity v of the ejector element is plotted as a function of time over a time interval (cycle time T) between a time 0 (at the end of the rounding operation) and time T (end of the next rounding operation). The rounding operation on a sheet metal blank has to be performed between the moment when the preceding blank leaves the rounding station (point V) and the end of the cycle (point T). Accelerated ejection commences immediately on impact (point S) and continues until transfer (point U) of the rounded blank to an ensuing transport means or processing station, this point U lying between point V and the end of the cycle (point T). While one sheet metal blank is undergoing the rounding operation, the preceding blank, which left the rounding station immediately before the start of this rounding operation, is conveyed away from the rounding station and at the same time the ejector element (or, as the case may be, the transport means on which the ejector element is mounted) is decelerated to impact speed. It is advisable to provide a brief safety interval (point 0 to point S) between the end of the rounding operation (T/0) and the impact of the ejector element on the edge of the blank (point S). Shortening the time required for ejection (point S to point V) within the allotted interval increases the time available for rounding the next can body (point V to point T), or allows the overall time interval to be shortened for a given rounding time.

Starting from a first velocity curve $P_1$, FIG. 1 shows that by increasing the impact velocity from $v_{s1}$ to $v_{s2}$ it is possible to shift the moment of departure from the rounding station from a point $V_1$ to an earlier point $V_2$, so that more time can be spent on rounding ($V_2$ to T) within a given cycle time, or alternatively the cycle time can be correspondingly reduced. Curve $P_3$, as distinct from curve $P_2$, shows how the moment of departure from the rounding station ($V_3$) can be further advanced by increasing the acceleration (i.e. the slope of the velocity curve).

While another sheet metal blank is being rounded, the preceding blank is conveyed away from the rounding station and transferred and the transport means is again decelerated to impact speed. The profile of the deceleration curve is irrelevant provided impact velocity ($v_{s1}$, $v_{s2}$) is attained for the moment S of impact.

FIG. 1, then, illustrates the solution adopted by the invention to achieve the stated object. Compared with the state of the art ($P_1$) it enables the impact velocity to be increased ($P_2$) by modifying the characteristic impact-curve. The effect is to shorten the time required for ejection. Additionally, by reducing the masses in motion and/or by using a suitable drive, acceleration after impact can be increased ($P_3$), resulting in a further reduction in ejection time.

For other applications, in particular for the transport of sheet metal blanks which are already in motion, FIG. 1 can be applied accordingly.

For the drive for the transport means propelling the ejector elements, a constant speed motor and a gear which produces the specified velocity profile may be used. Such an arrangement is costly but necessary for very high accelerations, and motors suitable for the application are available on the market. Less expensive are regulated servomotors whose speeds can be electronically controlled to follow a specified velocity profile. However, motors of this type are only available for limited outputs, so that the masses of the transport means and/or ejector elements must be kept very low in order to attain the accelerations (up to approx 80 g) required for the present application.

Figure 2:
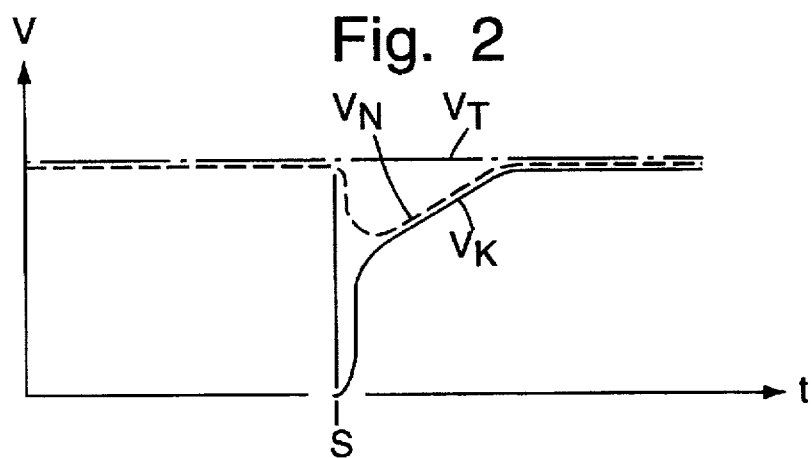
FIG. 2 shows the impact curve for an impact between an ejector dog with a damped shifting or rocking action and an initially stationary blank edge.

FIG. 2 shows schematically an impact curve between an ejector element with a damped shifting or rocking action and an initially stationary blank edge. The velocities of the transport means ($v_T$), ejector dog ($v_N$) and blank edge ($v_K$) are plotted as a function of time t. The transport means on which the ejector element is mounted moves through the point of impact at a velocity ($v_T$) which is for example constant. Upon impact (at point S) on the stationary blank edge, the ejector element is shifted or tilted with respect to the transport means in the opposite direction to the ejection direction, and is thereby retarded ($v_N$), while at the same time the blank edge is sharply accelerated until it attains the velocity of the ejector element. Damping of the ejector element is for example obtained by means of a spring arrangement, so that after the impact the ejector element is restored by spring force to its original position. The weaker the spring of the ejector element and the further it is able to shift with respect to the transport means, the sharper and more pronounced is the deceleration of the ejector element and the smaller is the acceleration which must be applied to the blank edge to bring it up to the same speed as the ejector element; and that means, the smaller are the forces acting on the blank edge. In other words, the higher the impact velocity required, the gentler the spring action of the ejector element has to be.

If the force of a suitable spring is not great enough to restore the ejector element to its initial position, means must be provided to return the ejector element to its original position before the next impact occurs and advantageously after the sheet metal blank is transferred. Such means may for example be suitable rocker arms arranged in regions of the returning strand of the transport means.

Figure 3:
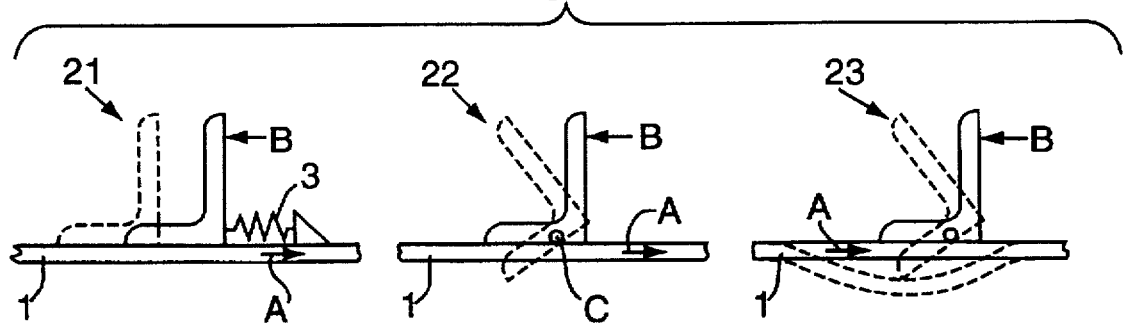
FIG. 3 shows the principle of the ejector dog with a damped shifting or rocking action on three embodiments schematically illustrated by way of example.

FIG. 3 shows by way of example three embodiments to illustrate the principle of the ejector element, or dog, with a damped shifting or rocking action. The transport means 1 is driven in the ejection direction A. As shown by the dog 21, the ejector dog may be shifted by a force B in the opposite direction to the ejection direction A from its rest position (drawn in unbroken outline) to a shifted position (in broken outline), this shifting action being damped by the spring 3. When the force B ceases to be applied, the spring 3 restores the dog to its rest position. Alternatively, as the example of the dog 22 shows, the dog may be tilted by the force B about an axis C, which is arranged at right angles to the ejection direction, from the rest position (in unbroken outline) to a tilted position (in broken outline), with for example elastically deformable means (not shown) again provided to restore the dog to the rest position. This means for restoring the dog to the rest position may for example be the transport means itself, as illustrated for the dog 23. Here the transport means is an elastic belt, for example a toothed belt, which transversely to the ejection direction is unguided or is guided at one side only, so that it is elastically deformed in the manner shown in broken outline when the dog is tilted by the force B. In this case the elasticity of the belt is used as the restoring force, which can be adjusted by varying the tension of the belt.

FIG. 4 shows by way of example an embodiment of the device according to the invention. The transport means is a toothed belt 11 which is guided and driven by a driving pulley 12 and a return and tensioning pulley 13. This belt is a standard commercial toothed belt, laterally guided at any point (not shown) for example by ball bearings. The driving pulley is actively connected to an electronically controlled drive motor. The synchronized velocity profile can of course also be obtained by means of a suitable gear. The tensioning pulley is arranged so as to be displaceable parallel with the ejection direction A, so that the belt tension can be adjusted by varying the position of the tensioning pulley. Disposed at equal intervals around the belt are for example four ejector dogs 23.1/2/3/4, the distance between dogs being greater than the largest height of can body to be processed. The point of impact S is located at the start of the ejection leg.

In the region of the point of impact, the belt is unguided at least in a direction at right angles to the ejection direction, that is to say, the ejector dog is able to tilt upon impact in the manner illustrated for the dog 23 (FIG. 3), the belt being locally deflected from the ejection direction so that the belt itself acts as a return spring owing to its own elasticity. If the belt is guided in the region of the point of impact S in a direction at right angles to the ejection direction A, for example as illustrated schematically by the pair of guide rollers 7, the belt is deflected only in the opposite direction to the ejection direction. At points remote from the point of impact, the belt may be guided or unguided as desired.

The toothed belt has the additional advantage, in relation to the transport chain, that it has a much lower mass to be accelerated and decelerated in a controlled cycle to obtain the velocity profile. As previously stated, this enables a higher acceleration of the dog, and hence a shorter ejection time, to be obtained for a given driving force. In addition, it provides better damping.

It has been found that with a device as shown in FIG. 4 the impact speed can be doubled (for example from 1 m/sec to 2 m/sec) relative to a device with ejector dogs rigidly mounted on a transport chain. Furthermore the device runs more quietly, even at this higher impact speed. The behaviour of the belt in the event of a jam or tailback of sheet metal blanks is superior, owing to the elasticity of the belt. If such a jam or tailback occurs, a standard commercial toothed belt will remain intact until the drive motor overload switch is tripped. A further advantage of the toothed belt over the transport chain is that the belt is an electrical insulator, thus eliminating (or at least reducing) the risk of spark erosion of the dogs.

FIG. 5 shows the ejector device of FIG. 4, viewed in the ejection direction. The device comprises a pair of part-devices 4 and 5 arranged parallel with one another so that a can body Z to be ejected is pushed and accelerated by two dogs 23. This arrangement will be found particularly advantageous where the two part-devices are actively connected to separate drive motors and the two drives are synchronized by electronic means. However, drive by a single motor is also feasible.

A further advantage of the arrangement with two parallel part-devices 4 and 5 as shown in FIG. 5 is revealed in FIG. 6. To adjust the ejector device to different can body diameters, the two part-devices and/or the ejector dogs are shiftable, parallel with one another, on the planes represented by the broken lines (arrows E). The angle between the broken lines is preferably 0° to 90°. If the two part-devices have independent drives, such adjustment can be made very easily.

Figure 7A:
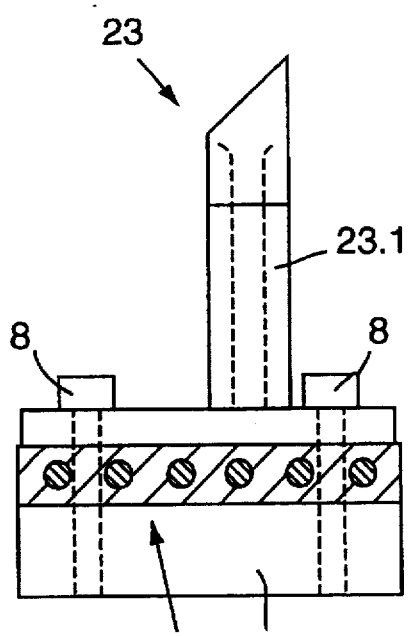
FIGS. 7 and 8 (a and b in each case) show two embodiments of attachments of ejector dogs to a toothed belt, viewed parallel with the ejection direction (FIGS. 7a and 8a) and at right angles to the ejection direction (FIGS. 7b and 8b).
Figure 7B:
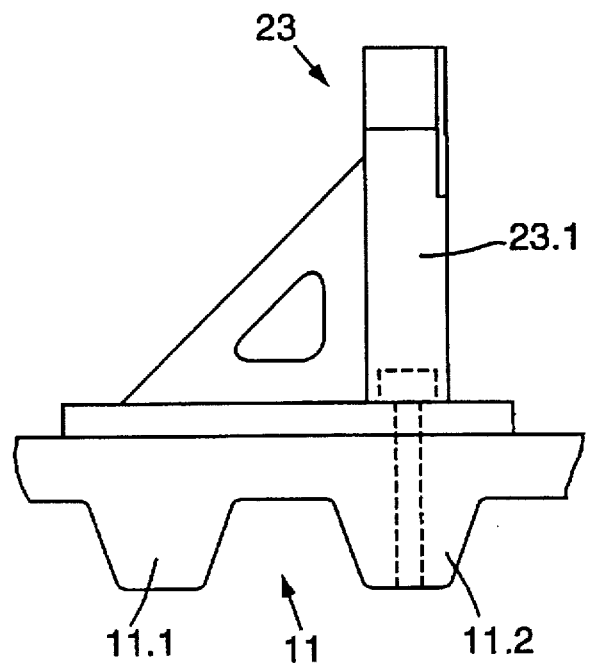
Figure 8A:
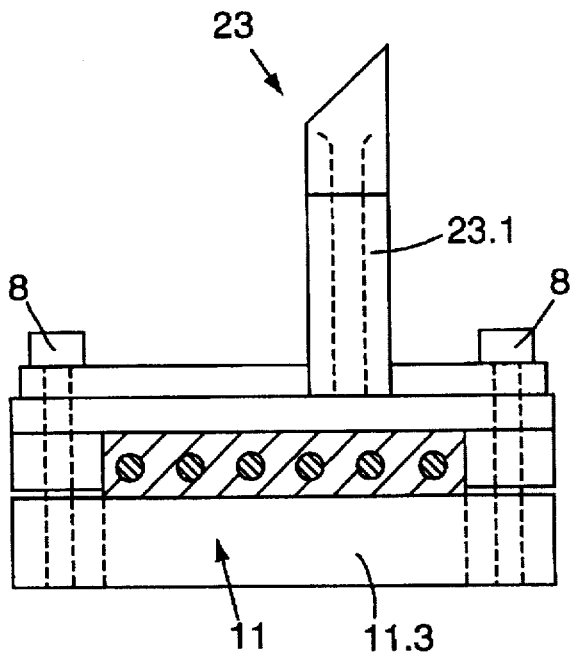
Figure 8B:
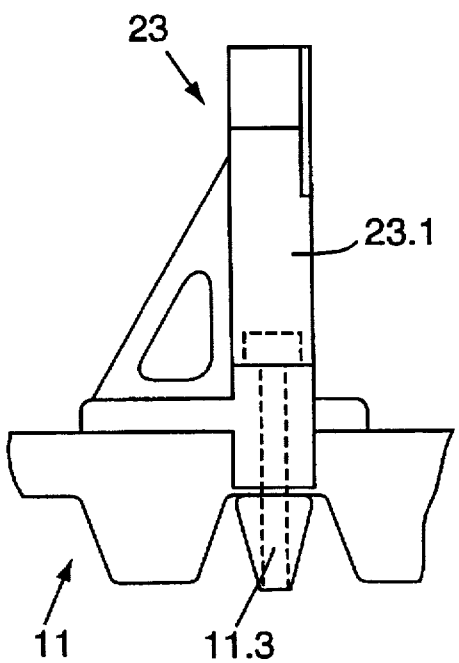

FIGS. 7 and 8 (a and b in each case) show examples of attachments of ejector dogs 23 to toothed belts 11, viewed parallel with the ejection direction (FIGS. 7a and 8a) and at right angles to the ejection direction (FIGS. 7b and 8b). The ejector dog 23 may for example be attached to the toothed belt 11 by means of an anchoring tooth 11.2 which takes the place of a tooth of the toothed belt 11 (FIGS. 7a and 7b), or by means of an extra tooth 11.3 between two teeth 11.1 of the toothed belt 11 (FIGS. 8a and 8b). In order that the belt 11 can run round freely, it is important in both cases to keep the extent of the attachment in the ejection direction as small as possible. In both embodiments, therefore, the dummy tooth (11.2) or extra tooth (11.3), which are advantageously made of steel, and the ejector dog are connected together by two fasteners, for example screws 8, located on a line perpendicular to the longitudinal extension of the belt.

With the embodiment with the extra tooth 11.3 (FIGS. 8a and 8b) it will be necessary to design the toothed driving and return pulleys for the toothed belt so that the extra tooth always engages with the pulley at the same point (or points) and that a tooth is absent at that point (or at each of those points).

The ejector dogs illustrated in FIGS. 7 and 8 are advantageously made of aluminum on account of the lightness of this material, and have a small carbide tip at the point of impact. They may also be made of steel or of a composite material.

We claim:

1. Device for serial transport of sheet metal blanks in a transport direction towards a processing station, comprising:
    a transport means driven with a synchronized velocity profile, the transport means is a belt which is to at least a degree elastically deformable in a direction generally parallel to the transport direction and which is guided and driven at least partially parallel with the transport direction by means of driving pulleys and return pulleys; and
    at least one transport element fixed to the belt so as to be capable of a damped shifting and/or rocking action with respect to the belt in the opposite direction to the transport direction, with absorption of energy.

2. Device according to claim 1, wherein the transport element includes at least one ejector dog attached to the belt with fasteners located along a line at right angles to the transport direction of the belt.

3. Device according to claim 1, further comprising an adjustable tensioning device for setting the belt to a specified tension.

4. Device according to claim 1, wherein the belt is toothed belt, the transport element is attached by means of an extra tooth between two teeth of the toothed belt, the driving and return pulleys are toothed pulleys and are dimensioned so that the extra tooth always engages with the pulleys at the same point of the belt and no tooth of the pulley is positioned at a corresponding point of the pulley.

5. Device according to claim 1, wherein the belt is a toothed belt and the transport element is an ejector dog attached to the belt by a dummy tooth.

6. Device for serial transport of sheet metal blanks in a transport direction towards a processing station, comprising:
    a pair of parallel conveyors having synchronously drivable transport means each coupled to a respective drive motor and electronic means for synchronizing the two motors to drive each of the transport means at a synchronized velocity profile; and
    at least one transport element fixed to respective ones of the transport means so as to be capable of a damped shifting and/or rocking action with respect to the belt in the opposite direction to the transport direction, with absorption of energy.

7. Device for serial transport of sheet metal blanks in a transport direction towards a processing station, comprising:

a pair of parallel conveyors having synchronously drivable transport means driven with a synchronized velocity profile, the two conveyors being arranged so as to be displaceable relative to one another in two planes oriented at an angle to one another, the angle between the two planes being between about 0° to 90° to vary the spacing between the two conveyors; and at least one transport element fixed to respective ones of the transport means so as to be capable of a damped shifting and/or rocking action with respect to the belt in the opposite direction to the transport direction, with absorption of energy.

* * * * *